US012084636B2

United States Patent
Oswald et al.

(10) Patent No.: US 12,084,636 B2
(45) Date of Patent: Sep. 10, 2024

(54) FLAVOR ENHANCED HOP MATERIALS

(71) Applicant: Abstrax Tech Inc., Tustin, CA (US)

(72) Inventors: Iain W. H. Oswald, Tustin, CA (US); Marcos A. Ojeda, Tustin, CA (US); Eugene Lee, Tustin, CA (US); Kevin A. Koby, Tustin, CA (US); Ross W. Hunsinger, Tustin, CA (US); Thomas J. Martin, Jr., Tustin, CA (US)

(73) Assignee: Abstrax Tech Inc., Tustin, CA (US)

( * ) Notice: Subject to any disclaimer, the term of this patent is extended or adjusted under 35 U.S.C. 154(b) by 0 days.

(21) Appl. No.: 18/377,229

(22) Filed: Oct. 5, 2023

(65) Prior Publication Data

US 2024/0117282 A1   Apr. 11, 2024

Related U.S. Application Data

(60) Provisional application No. 63/413,409, filed on Oct. 5, 2022.

(51) Int. Cl.
| | |
|---|---|
| C12C 5/02 | (2006.01) |
| C11B 1/10 | (2006.01) |
| C12C 3/08 | (2006.01) |

(52) U.S. Cl.
CPC ............. C12C 5/026 (2013.01); C11B 1/10 (2013.01); C12C 3/08 (2013.01)

(58) Field of Classification Search
CPC .............. C12C 5/026; C12C 3/08; C11B 1/10
USPC ........................................................ 426/592
See application file for complete search history.

(56) References Cited

U.S. PATENT DOCUMENTS

| | | |
|---|---|---|
| 2020/0048590 A1 | 2/2020 | Wolinska |
| 2021/0245666 A1 | 8/2021 | Atang et al. |
| 2021/0340472 A1* | 11/2021 | Flemmens ............. C12C 9/025 |
| 2022/0017838 A1 | 1/2022 | Beddie |

OTHER PUBLICATIONS

International Search Report and Written Opinion in PCT/US2023/034582 dated Mar. 11, 2024 (17 pages).

* cited by examiner

*Primary Examiner* — Brent T O'Hern
(74) *Attorney, Agent, or Firm* — Foley & Lardner LLP

(57) ABSTRACT

Compositions which include hop materials infused with exogenous flavorant matrix and methods for infusing hop materials with a flavorant matrix are provided, wherein the method includes emulsifying a flavorant additive into a carrier system to provide a flavorant matrix; and infusing the hop material with the flavorant matrix.

15 Claims, 2 Drawing Sheets

FLAVOR ENHANCED HOP MATERIALS

CROSS REFERENCE TO RELATED APPLICATIONS

This application claims the benefit of U.S. Provisional Application No. 63/413,409, filed Oct. 5, 2022, the disclosure of which is incorporated herein by reference in their entirety.

FIELD

The present technology relates generally to the field of flavorant enhancement of consumable substances, including beverages. In particular, the present technology relates to compositions and methods for infusing hops and hop products with flavorant additives.

BACKGROUND

The following discussion is provided to aid the reader in understanding the disclosure and is not admitted to describe or constitute prior art thereto.

Hops (*Humulus lupus*) are an annual flowering plant that are cultivated for the purpose of adding flavor, aroma, and bitterness to beer. Hops are a key ingredient in the product of many fermented alcoholic beverages such as beer. Their inclusion in the brewing process has been used for hundreds of years, highlighting their importance within this industry. The fruiting body of hops, colloquially referred to as cones, contain the essential oil of the plant that is rich in numerous secondary metabolites, that provide bitterness, flavor, and aromatic properties. In particular, bittering acids can exist in significant quantities, along with a variety of volatile compounds such as terpenes, polyfunctional thiols, esters, aldehydes, and other important compounds that create the unique flavor and aroma of a hop variety. The bitterness is imparted by the presence of a acids, which are a class of chemical compounds including humulone and humulone derivatives, a key alpha acid in hops. While these products are used in the brewing process ubiquitously, brewers are limited in flavor to the hops grown during a given harvest.

Additionally, the volatile and semi-volatile compounds such as terpenes, esters, alcohols, and polyfunctional thiols found in hops have become increasingly important for the development of beers with unique flavors. For instance, Noble hops, such as the variety Saaz, are typically grown in Europe and possess unique aromas compared to those bred and cultivated in the pacific northwest of the United States such as Strata, Citra, or Mosaic. These different hop varieties are used for different types of products to impart unique aromas and flavors as desired. While the raw, kilned (or un-kilned) hops can be added directly to the beer processing (referring to as "whole-cone"), many producers prefer to use hop pellets (hop cones pressed under pressure into pellets) due to their enhanced concentration of alpha acids and aroma compounds, as well as convenience due to a small volume form factor compared with whole cone hops.

While hops are cultivated in significant quantities in USA, their long growth cycle and sluggish breeding process slows the ability to produce new varietals with unique flavors or enhanced physical characteristics such as disease or insect resistance or increased yield in a timely fashion. Furthermore, environmental factors such as drought, smoke taint from wildfires, and other variables can damage the crops to the point where they are no longer desirable to brew beer with. For instance, smoke tainted hops possess very undesirable aromas and flavors that preclude a given vintage from being used in an established product line, as the flavor profile would contain these defect flavors. Lastly, genetic drift, or other genetic factors can result in the slow progression of unintended flavor modifications as a function of time, can result in clones or propagations of legacy varietals to have different flavor profiles over time, which again can detrimentally impact their usage in an established product line with a known flavor profile. Each of these factors suggest a need to develop new methods and compositions to not only help standardize the aroma and flavor of a given variety, but also a need to help diversify the available flavors within the marketplace.

SUMMARY

According to a first aspect, a method for infusing hop materials with a flavorant matrix is provided. The method includes emulsifying a flavorant additive into a carrier system to provide a flavorant matrix and infusing the hop material with the flavorant matrix.

In at least one embodiment, the flavorant additive includes hop oil, hop extract, flavor blends or non-hop derived flavorant compound. In at least one embodiment, the flavorant matrix includes water-soluble liquid or water-soluble powder. In at least one embodiment, the flavorant additive is emulsified into a water-soluble liquid or water-soluble powder matrix to form the flavorant matrix.

In at least one embodiment, the hop material includes raw hops, pellets, raw vegetal material derived from hops, cryogenically prepared hop lupulin, or a combination of any two or more thereof. In at least one embodiment, the carrier system includes oils, emulsifiers or terpenes. In at least one embodiment, the infusing step comprises electrospray application, submersion, passive diffusion, aerosolizing, simple mixing, cold-pressing, or a combination of any two or more thereof.

In another aspect, a method for extracting hop oil from hops is provided. The method includes contacting hops or hop pellets with butane solvent at a suitable temperature for a suitable period of time to provide an extract comprising a butane-rich liquid and vegetal hop material; separating the butane-rich liquid from the residual vegetal hop material; and processing the butane-rich liquid by removing butane to provide hop oil.

In at least one embodiment, the hop oil is substantially free of bittering acids. In at least one embodiment, the hop oil is substantially free of bittering acids, waxes, and lipids. In at least one embodiment, the method for extracting hop oil from hops further includes drying the vegetal hop matter and infusing it with a flavorant matrix, wherein the flavorant matrix comprises a flavorant additive. In at least one embodiment, the flavorant additive is emulsified into a water-soluble liquid or water-soluble powder flavorant matrix before infusing into vegetal hop matter. In at least one embodiment, the separating includes filtering the extract to separate the solvent-rich liquid from the vegetal hop material. In at least one embodiment, the processing includes removing the solvent by distillation, rotary evaporation, column separation, devolatilization, or a combination of any two or more thereof.

In another aspect, a method for incorporating bittering acids into beer using a water-soluble flavorant matrix is provided. The method includes emulsifying a flavorant additive comprising one or more bittering acids to provide a water-soluble flavorant matrix; and adding the flavorant matrix to the beer during or after the brewing process. In at least one embodiment, the flavorant additive comprises one or more un-isomerized bittering acids. In at least one embodiment, the flavorant additive comprises one or more alpha acids, beta acids or a mixture thereof.

In a further aspect, a composition is provided, wherein the composition includes an exogenous flavorant matrix incorporated into a vegetal hop matrix, wherein the flavorant matrix comprises a flavorant additive selected from hop acids, hop oil, hop extract, flavor blends, non-hop derived flavorant compound, or a combination of any two or more thereof. In at least one embodiment, the flavorant matrix comprises a flavorant additive which is emulsified into a water-soluble liquid or water-soluble powder. In at least one embodiment, the flavorant matrix comprises un-isomerized bittering acids, and wherein the un-isomerized bittering acids are emulsified to increase water solubility.

DETAILED DESCRIPTION

Figure 1:
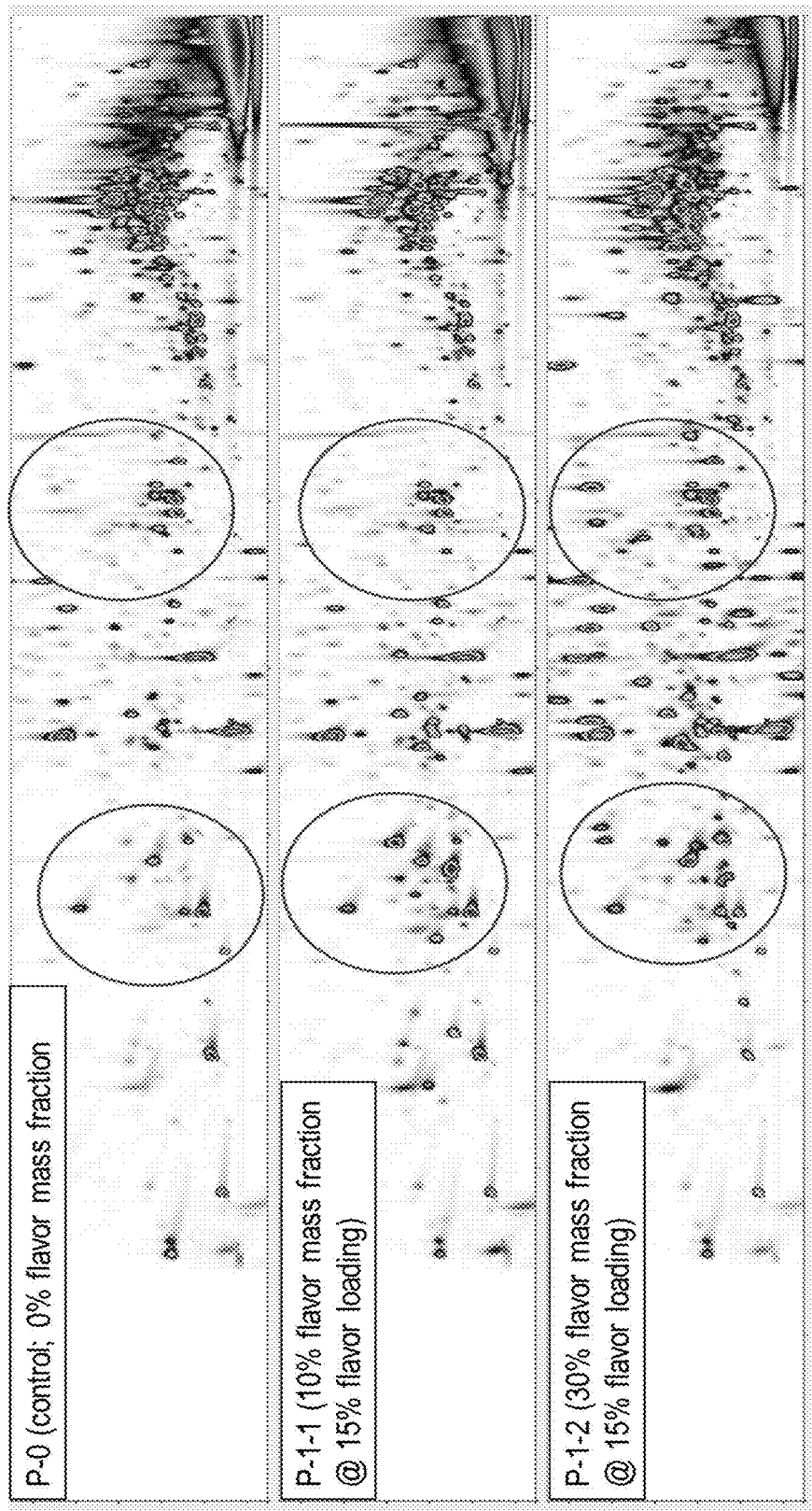
FIG. 1 represents 2-Dimensional chromatograms of the GC×GC-TOF-MS highlighting the enhancement of compounds in hops material with increase in flavorant dosage.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified. As a non-limiting example, a reference to "X and/or Y" can refer, in one embodiment, to X only (optionally including elements other than Y); in another embodiment, to Y only (optionally including elements other than X); in yet another embodiment, to both X and Y (optionally including other elements).

Unless indicated otherwise, reference to "percent" is to be understood as "weight percent," and reference to "ratio" is as a weight/weight ratio.

As used herein, the term "terpene compound" is understood to mean any organic compound that contains some isoprene subunit within its structure and their oxygenated derivatives.

As used herein, the terms "odor" and "aroma" are used interchangeably and represent the sensory attributes of certain substances perceptibly determined by the olfactory system.

As used herein, the term "flavoring agent" or "flavorant" is understood to mean an additive that is meant to improve the flavor (taste) and/or aroma impression of food or other substances, and can include both natural and synthetic ingredients. For example, a flavorant can include an aroma and/or a flavor agent.

The terms "consumable substance," "consumable product," "consumable material," "food product," "infused liquid," and the like are used interchangeably herein and refer to any material suitable for being infused with an infusion material. The consumable substance can comprise any edible gas, liquid, or solid, or a mixture thereof and include any edible material or mixture of edible materials, such as food and beverages.

As used herein, the term "substantially free" may refer to a composition that has little or no content of the stated component. For instance, "substantially free of bittering-acids" refers to a composition that has little or no bittering-acids, e.g., the content of bittering-acids is less than 5 wt. %, preferably less than 1 wt. %, most preferably less than 0.5 wt. % based on the weight of the composition. Likewise, a composition "substantially free of lipids, waxes, flavonoids, and plant matter," indicates that the composition that has little or no lipids, waxes, flavonoids, and plant matter, such as less than 5 wt. %, preferably less than 1 wt. %, most preferably less than 0.5 wt. % based on the weight of the composition. In some embodiments, the composition is free of the stated component.

The inventors of the present technology have discovered new products and methods for not only increasing the diversity of flavors available while retaining the same form factor that the brewing process is accustomed to (e.g., use of whole-cone hops, cryogenically prepared lupulin pellets, or pelletized hops), but also to provide a means to retain a consistent flavor profile in cases where this is desired. They developed a technology which provides innumerable flavors to be incorporated into the brewing process using standardized materials and methods, and also takes advantage of certain waste products produced during hop harvesting and the brewing process. Although described in terms of the brewing process and hop products, the compositions, flavorants and methods have vast application in all types of consumable products.

Provided here are methods for addressing the aforementioned problems in a way that is both convenient and familiar to the users of hops. Generally, provided here are methods where a hop-derived starting material can be infused with a specific flavor of choice.

Various aspects and/or embodiments of this disclosure relate to compositions, products, and methods for providing flavorant (i.e., aroma and/or flavor) infused consumable materials. Other aspects and/or embodiments relate to compositions, products, and methods for providing flavorant infused hop materials. Yet other aspects and/or embodiments relate to methods for infusing hop materials with a flavorant matrix. Other aspects and/or embodiments relate to methods for extracting hop oil from hops or hop pellets.

The present disclosure generally relates to products incorporating certain flavorant additives as will be described herein below. The types of products encompassed by the present disclosure vary and, as such, in some embodiments, their method of preparation can similarly vary, as will be disclosed in detail herein. In certain aspects, the disclosure relates to food products, beverages and inhalable substance which include the flavorants. In certain aspects, the disclosure relates to beverages that include the flavorants. In certain aspects, the disclosure relates to beer products that include the flavorants.

In various embodiments, products and methods are provided which incorporate one or more flavorants into consumable products, including e.g., hop materials. In one aspect, provided herein are methods for enhancing the flavor and/or aroma of consumable products, including e.g., hop materials. In one aspect, provided herein are methods for enhancing the flavor and/or aroma of beverages, including e.g., beer. In one aspect, provided herein are methods for infusing hop materials with a flavorant, wherein the method includes emulsifying the flavorant additive into a carrier system to provide a flavorant matrix; and infusing the hop material with the flavorant matrix.

Suitable hop varieties are known in the art and can be used herein. In some embodiments, the hop materials used are traditionally associated with the beer or craft-beer industry. In some embodiments, a single hop variety is employed in the methods and products herein and in other embodiments, a combination of two or more hop varieties are employed. In other embodiments, the hops incorporated within products according to the present disclosure are in solid forms such as pellets and powders or in the liquid form, such as oils and extracts.

Suitable hop materials used in the present technology may include various forms of the hop, such as, raw hops, whole leaf hops, powders, cones, extracts, pellets, raw vegetal material derived from hops, cryogenically prepared hop lupulin, or of any two or more thereof. In some embodiments, the hop material used in the present technology may include raw vegetal material derived from hops. In some embodiments, hop materials according to the present disclosure are in solid form, such as mechanically ground or milled powders or pellets. The hop material may be obtained by extracting raw hops, kilned hops, or pellets with a suitable solvent, such as a hydrocarbon solvent (e.g., butane) at low temperatures, and separating the liquid layer was from the residual vegetal hop material. The vegetal hop material can be dried after removing the solvent and used as such or can be further treated to be used as the hop material. When included in a composition, the hop material, when present, constitutes about 0.001% to about 99% by weight of the total weight of the composition, including without limitation, about 0.01% to about 80%, about 0.1% to about 70%, about 1% to about 60%, about 10% to about 50%, about 20% to about 40%, about 25% to about 35%, or about 30% to about 90% by weight of the total weight of the composition, or any range including and/or in-between any two of these values.

The flavorant additives can include natural, plant-derived compounds or synthetic compounds and are derived or prepared based on certain specific desired taste and/or aroma characteristics. For example, certain flavorants are derived from a plant of the *Humulus lupulus*. Certain flavorants are derived from or created to mimic the flavorants of products such as fruits, spices, herbs, flowers and the like, or combinations thereof. For example, the flavorant can be selected, e.g., based on the desired aroma and/or flavor characteristics (e.g., fruity, citrus-like, flowery, spicy/herbal, tropical, earthy, piney, and the like). The flavorant matrix may include both a liquid phase (e.g., neat, un-emulsified or carrier-containing flavor compositions) and a solid phase (e.g., flavor compositions integrated into a dried emulsion system or other carrier system). In some embodiments, the flavorant matrix may include hop oil (e.g., hop essential oil), hop extract, hop acids (e.g., bittering acids, un-isomerized acids), emulsified flavor blends or non-hop derived flavorant compound. In some embodiments, the flavorant matrix may include exogenous hop oil, emulsified flavor blends or a combination thereof.

In various embodiments, the flavorant matrix can be used as such and added directly to consumable products without being infused into hop materials. Thus, in one aspect, the present technology provides methods for enhancing the flavor and/or aroma of a consumable product by the addition the flavorant matrix described herein. In another aspect, the present technology provides methods for enhancing the flavor and/or aroma of hop materials by the addition the flavorant matrix described herein. In another aspect, the present technology provides methods for enhancing the flavor and/or aroma of consumable products by the addition the flavorant infused hop materials described herein.

The flavorant additive is incorporated into a carrier system to provide a flavorant matrix. The flavorant matrix is exogenously added or infused into the hop material. In certain embodiments, the flavorant matrix may include a flavorant additive which is emulsified into a water-soluble liquid or water-soluble powder. In some embodiments, the flavorant additive is emulsified into a carrier system to provide a flavorant matrix. In some embodiments, the flavorant additive is used without a carrier system. Suitable carrier systems may include various oils, emulsifiers and terpenes, or in some cases, water. Illustrative carriers may include, but are not limited to phospholipids (e.g., lecithin, sunflower lecithin), xanthan gum, guar gum, carrageen, polysorbate 80, gum acacia, quilaja extract, monoglycerides, argan oil, coconut oil, jojoba oil, medium chain triglyceride oil (MCT) or propylene glycol (PG), brominated vegetable oil (BVO), ester gum, terpenes and the like and combinations thereof.

The emulsification of either flavor additives can be achieved by first obtaining and tailoring the flavorant additive (e.g., a flavor blend) to the correct density using weighting agents (e.g., ester gum, brominated vegetable oil (BVO), etc.), to create an oil phase. Separately, water may be mixed with one or more emulsifying agents (e.g., soy lecithin, sunflower lecithin, polysorbate 80, gum acacia, quilaja extract, etc.), until both phases are homogeneous. To this mixture, the density-optimized flavor additive is added and mixed. The resulting solution is then emulsified utilizing a high-shear process which may include, but is not limited to, high-shear mixing for a suitable time (e.g., at least about 5 min), high pressure homogenization (e.g., at least about at least 1000 psi), or ultrasonic homogenization. After high shear mixing the resulting homogeneous emulsion product, which is the flavorant matrix composition, can be removed and stored in a sealed container for further use. Thus, in one embodiment the flavorant matrix is prepared by includes mixing an aqueous emulsifying agent with an oil based flavorant additive to provide a mixture and emulsifying the mixture using a high-shear process. When included in a composition, the flavorant additive may constitutes about 0.001% to about 20% by weight of the total weight of the composition, including without limitation, about 0.005% to about 15%, about 0.01% to about 10%, about 0.05% to about 8%, about 0.1% to about 5%, about 0.1% to about 3%, or about 0.1% to about 2% by weight of the total weight of the composition, or any range including and/or in-between any two of these values.

The flavorant additives can be hop derived, such as the essential oil of hops, a hop extract, or can be non-hop derived wherein the flavor composition is composed of botanically sourced compounds. Hops typically contain resins, oils, waxes, soluble material such as tannins, proteins, and pectins, and a cellulosic matrix. Hops also include an acid component (e.g., bittering acids including alpha acids and beta acids, etc.), that produces the bitterness in beers that many consumers typically associate with the flavor of hops. This acid component or bittering acids may include isomerized acids and un-isomerized acids. The flavorant additives can include hops acids-alpha acids, beta acids, isomerized acids, un-isomerized acids and combinations thereof. In certain embodiments, hop oils are used, which may or may not include acids. In certain embodiments, hop extracts are used which include components of the resins and/or oils. In some embodiments, extracts including resin and/or oil components are used. Hop resin generally includes humulones (e.g., alpha acids such as humulone, cohumulone, adhumulone, and posthumulone) and lupulones (e.g., weakly acidic beta acids such as lupulone, colupulone, and adlupulone), and salts thereof. In some embodiments, a hop extract is employed which includes one or more of alpha acids, beta acids, and essential oils. In certain embodiments, hop oils are used in the flavorant matrix. The raw hop oil can be used in the crude form or can be stripped of bittering agents prior to the infusion step. In some embodiments, the hop oil is substantially free of bittering acids. In some embodiments, the hop oil is includes bittering acids. In other embodiments, the hop oil is substantially free of bittering acids, waxes, and lipids. In some embodiments, the hop oil includes bittering acids. In some embodiments, the hop oil includes un-isomerized acids. In some embodiments, the hop oil includes isomerized acids. In some embodiments, the hop oil includes both isomerized acids and un-isomerized acids. In some embodiments, the un-isomerized bittering acid is first emulsified to increase its water solubility and then infused into the hop materials.

The flavorant matrix may include emulsified flavor blends, such as for example, terpene blends. In such cases, the flavorant additives in the flavorant matrix may include one or more terpenes, terpenoids or terpene blends, which may be commercially available or can be synthesized depending on the desired aroma and/or flavor characteristic. In some embodiments, the flavorant additives include emulsions of one or more terpenes, terpenoids or terpene blends. Suitable terpene or terpenoid include, but are not limited to α-bisabolol, borneol, camphene, camphor, β-caryophyllene, γ-3-carene, caryophyllene oxide, α-cedrene, β-eudesmol, fenchol, geraniol, guaiol, α-humulene, isoborneol, limonene, linalool, menthol, myrcene, nerol, cis-ocimene, trans-ocimene, α-phellandrene, α-pinene, β-pinene, sabinene, α-terpinene, α-terpineol, terpinolene, α-guaiene, elemene, farnesene, germacrene, guaiol, bergotamene, thujene, ylangene, sabinene hydrate, pinanol, selina-3,7(11)-diene, eudesm-7(11)-en-4-ol, and valencene. In some embodiments, the flavorant additives include emulsions of commercially available terpene blends.

In one aspect, the method includes infusing the hop material with the flavorant matrix. The infusing step may be conducted using various known methods, including, but not limited to electrospray application, submersion, passive diffusion, agitation, aerosolizing, simple mixing, cold-pressing, or a combination of any two or more thereof. The flavorant infused product can be further processed or modified into any suitable form such as pellets, liquids or powders. The hop materials and hop oils can be obtained commercially or can be prepared using a process which allows for preparation of vegetal matter which can be readily infused with the flavor of choice and preparation of flavorant matrix which can solubilize insoluble compounds.

The methods described herein are advantageous in increasing the concentrations of exogenous compounds that maybe beneficial for enhancing the flavor of hops and beverages. In some embodiments, the methods provide increased levels of compounds found in the flavor blend that are not found in hops. In some embodiments, the methods provide enhancement of flavor blend specific compounds in the product. The methods described herein facilitate infusion of insoluble flavorant additives which are otherwise challenging to add to the products. This is made possible by emulsification of the insoluble flavorant additive to provide a water-soluble flavorant matrix.

In one aspect, provided herein are methods for extracting hop oil from hops, wherein the method includes contacting hops with suitable solvent at a suitable temperature for a suitable period of time to provide an extract comprising a solvent-rich liquid and vegetal hop material; separating the solvent-rich liquid from the residual vegetal hop material; and processing the solvent-rich liquid by removing solvent to provide hop oil. The hop oil may be extracted from hops (e.g., raw hops, kilned hops) or hop pellets. In some embodiments, the solvent includes a hydrocarbon, an ether, a terpene, an alcohol, or a combination of any two or more thereof. In some embodiments, the solvent includes methanol, ethanol, propanol, butanol, isopropanol, acetic acid, chloroform, diethyl ether, dichloromethane, ethyl acetate, methylene chloride and carbon disulfide, butane, pentane, hexane, or a combination of any two or more thereof. In some embodiments, the solvent includes butane. In some embodiments, the separation may include filtration, decantation or centrifugation. In some embodiments, the separating includes filtering the extract to separate the solvent-rich liquid from the vegetal hop material. In some embodiments, the processing step includes removing the solvent by distillation, rotary evaporation, column separation, devolatilization, or a combination of any two or more thereof. In some embodiments, a method is provided, which includes freeze-drying the hops to provide vegetal hop material.

In one aspect, provided herein are methods for extracting bittering acids from hops, wherein the method includes contacting hops or hop pellets with butane solvent at a suitable temperature for a suitable period of time to provide an extract comprising a butane-rich liquid and vegetal hop material; separating the butane-rich liquid from the residual vegetal hop material; recovering the bittering acids from the butane-rich liquid and purifying the bittering acids. The purified bittering acids may include alpha acids, beta acids and combination thereof. The purified bittering acids may include isomerized acids, un-isomerized acids and combinations thereof. The purified bittering acids may be emulsified with suitable carrier or emulsifying agent.

The present inventors additionally surprisingly found that the powdered flavor blends are amicable to include alpha-acids as well. While beer typically contains isomerized acids to add bitterness, they do not contain appreciable amounts of un-isomerized acids. The present method of solubilizing insoluble compounds to use them as a flavorant matrix in various products, extends to these un-isomerized acids such as humulone and its derivatives. The present technology thus provides a unique process to modify the amount of bitterness in a beer in a completely unique way, i.e., by adding un-isomerized acids that is not dependent on boiling hops to induce the isomerization of alpha-acids. The methods of the present technology allow for greater control of bitterness without typical isomerization—i.e., heating of the hops during boiling—as the bittering acids may be added at essentially any time of the brewing process and still become solubilized. Thus, in one aspect, the present technology provides methods for infusing consumables with a flavorant matrix, wherein the flavorant matrix may include un-isomerized hop acids. In another aspect, the present technology provides methods for method for infusing hop materials with a flavorant matrix, wherein the flavorant matrix may include an un-isomerized hop acids. The flavorant matrix which includes the un-isomerized hop acids may be directly used to flavor various consumable products, without being infused into hop materials. For example, the flavorant matrix which includes the un-isomerized hop acids can be used to flavor beer. In various embodiments the un-isomerized hop acid is an emulsified un-isomerized hop acid. In certain embodiments, the present technology provides methods for incorporating un-isomerized hop acids into beer using a water-soluble flavorant matrix, wherein the method includes emulsifying a flavorant additive comprising one or more bittering acids to provide a water-soluble flavorant matrix; and adding the flavorant matrix to the beer during or after the brewing process.

The emulsification and infusion methods described herein can be used to incorporate water-insoluble components such as bittering acids and polyphenol flavonoids into the beer by converting them into a water-soluble matrix. In one aspect, provided herein are methods for incorporating bittering acids into the brewing process using a water-soluble flavorant matrix. The bittering acids may include isomerized acids, un-isomerized acids or a combination thereof. In some embodiments, the method includes emulsifying the isomerized acid, to provide a water-soluble flavorant matrix rich in isomerized acid. In some embodiments, the method includes emulsifying the un-isomerized acid, to provide a water-soluble flavorant matrix rich in un-isomerized acid. In some embodiments, the method includes emulsifying the bittering acid with lecithin. In some embodiments, the method includes pelletizing the water-soluble flavorant matrix. In some embodiments, the method includes adding the water-soluble flavorant matrix to the brew during or after the beer brewing process. In some embodiments, the water-soluble flavorant matrix imparts flavor and/or aroma to the beer. In some embodiments, the water-soluble flavorant matrix imparts bitterness to the beer. In one aspect, provided herein are methods for incorporating polyphenol flavonoids into the brewing process using a water-soluble flavorant matrix.

In one aspect, provided herein are compositions containing an exogenous flavorant matrix incorporated into hop materials. Suitable flavorants and hop materials are described herein. In some embodiments, the hop materials include a vegetal hop matrix. In some embodiments, the exogenous flavorant matrix includes un-isomerized bittering acids, wherein the bittering acids are emulsified to increase water solubility. In some embodiments, the composition includes a pelletized flavorant matrix. In one aspect, provided herein is a flavorant additive extracted from hop wherein the said additive includes at least about 10% by wt., preferably at least about 30% by wt., more preferably at least about 50% by wt., most preferably at least about 70% by wt., of one or more of hop bittering acids. In one aspect, provided herein is a flavorant additive extracted from hop wherein the said additive includes at least about 10% by wt., preferably at least about 30% by wt., more preferably at least about 50% by wt., most preferably at least about 70% by wt., of one or more of hop alpha acids. In one aspect, provided herein is a flavorant additive extracted from hop wherein the said additive includes at least about 10% by wt., preferably at least about 30% by wt., more preferably at least about 50% by wt., most preferably at least about 70% by wt., of one or more of hop un-isomerized acids.

In another aspect, the composition containing an exogenous flavorant matrix incorporated into hop materials can be formulated to have various applications. In a non-limiting way, the composition can be an edible composition, an aerosol composition, a flavor composition, a fragrance composition, or an inhalable composition. In certain embodiments, an edible product comprising a composition described herein is provided. In certain embodiments, the composition is an edible composition. In certain embodiments, the composition is an aerosol composition. In certain embodiments, the composition is a flavor composition. In certain embodiments, the composition is a fragrance composition. In certain embodiments, the composition is an inhalable composition.

The flavorant matrix may further include additional flavoring and/or aroma agents including, but not limited to, ethyl butyrate, ethyl isovalerate, methyl anthranilate, vanillin, ethyl maltol, maltol, strawberry furanone (4-OH-2,5-dimethyl-3-furanone), raspberry ketone (anisyl acetone), isoamyl acetate, isoamyl butyrate, ethyl caproate, octanal, octanol, aldehyde c-16, allyl caproate, ortho-tolualdehyde, benzaldehyde, sweet almond oil, bitter almond oil, beta-ionone, hexyl butyrate, hexyl acetate, hexyl hexanoate, propyl caproate, folione, citronellyl formate, 2-phenylpropyl isobutyrate, propionyl thiazole, methional, methyl heptadienone, gamma decalactone, melonal, passifloran, methyl-2 butyl acetate, lime terpenes, peppermint oil, orange oil, prenylthiol, and the like, or a combination of any two or more thereof. Additional examples of flavoring agents include ingredients that are "generally recognized as safe" ("GRAS") by the United States Food and Drug Administration ("FDA"), for example, those listed as approved under 21 C.F.R. §§ 172.510, 172.515, and 172.560. The flavoring agents may also include additional ingredients such as weighting agents (e.g., brominated vegetable oil (BVO), ester gum (EG), damar gum (DG), or sucrose acetate isobutyrate (SAIB)), emulsifying agents (lecithin, carrageenan, guar gum, xanthan gum, celluloses, polysorbates, sorbitan esters, sucrose esters, fatty acid glycerides etc.) oils, and the like or combinations thereof. Depending upon the end application, the compositions may include other ingredients, such as surfactants, co-solvents, propellants, other flavoring agents, medicinal agents, perfumes, stabilizers, thickeners, binders, preservatives, emulsifiers, essential oils, water, salt, sweeteners, gelatin, food additives, colorants, excipients, diluents, and the like or a combination of any two or more thereof. Such more additional ingredients, when present, may be included in an amount of from about 0.001 to about 10 wt. %, including from about 0.01 to about 5 wt. %, based on the total weight of the composition.

EXAMPLES

Various embodiments will be further clarified by the following examples, which are in no way intended to limit this disclosure thereto.

Illustrative methods for infusing hops with a desired flavor profile are provided below. Table 1 provides a summary of each method.

| Method No. | Flavor additive/matrix | Flavor loading* | Flavor additive mass fraction (%) | Pellet mass fraction (%) | %-increase in available flavor |
|---|---|---|---|---|---|
| P-0 | N/A | 0% | 0% | 100% | 0.0% |
| P-1-1 | Infused Powder | 25% | 10% | 90% | 2.5% |
| P-1-2 | Infused Powder | 25% | 30% | 70% | 7.5% |
| P-1-3 | Infused Powder | 25% | 50% | 50% | 12.5% |
| P-1-4 | Infused Powder | 25% | 80% | 20% | 20.0% |
| P-1-5 | Infused Powder | 25% | 100% | 0% | 25% |
| P-2-1 | Neat flavor additive Oil | 100% | 1% | 99% | 1.0% |
| P-2-2 | Neat flavor additive Oil | 100% | 5% | 95% | 5.0% |
| P-2-3 | Neat flavor additive Oil | 100% | 10% | 90% | 10.0% |
| P-3-1 | Emulsion and hop oil additive (control) | 0 | 0 | 100% | 0% |
| P-3-2 | Emulsion and hop oil additive | 2% | 5% | 95% | 0.1% |
| P-3-3 | Emulsion | 2% | 5% | 95% | 0.1% |
| P-3-4 | Emulsion | 2% | 20% | 80% | 2.0% |

*Flavor loading refers to weight percent of flavor additive added to carrier matrix.

Example 1. Infusion of Hops or Hop Pellets with Flavor Composition

E1-1. Strata variety Hop pellets were mechanically ground and added to a 20 mL scintillation vial followed by addition of a powdered Centennial flavor additive (Abstrax Tech brand) in the amounts shown in Table 1 (P-1-1, P-1-2, P-1-3, P-1-4). The resulting solid mixture was agitated for 10 min to homogenize the sample, and was then pelletized.

E1-2. Strata variety hop pellets were mechanically ground and added to a 20 mL scintillation vial followed by addition of a liquid Centennial flavor additive (Abstrax Tech brand) in the amounts shown in Table 1 (P-2-1, P-2-2, P-2-3). The resulting solid mixture was agitated for 10 min to homogenize the sample, and was then pelletized.

Example 2. Reduction of Latent Essential Oil in Hops or Hop Pellets Followed by Infusion with Flavor Composition Multiple methods were used to reduce the native essential oil content in hops and hop pellets followed by infusion of a non-solid flavor composition.

E2-1. The essential oil of 6800 g of either raw hops, kilned hops, or pellets was extracted using butane at −25° F. for 10 min. After the oil was dissolved in butane, the liquid layer was separated from the residual vegetal hop material. The butane-rich liquid layer was then processed by removing butane at 75° F. for 8 h. The remaining vegetal hop material was then dried, and butane evaporated at 75° F. under vacuum conditions.

E2-2. The essential oil of 63 g of Strata variety hop pellets was reduced by using a Harvest Right freeze drier (model HRFDS). After the oil and water was evaporated, the residual vegetal hop material was recovered (60.3 g recovery). The vegetal hop material was then stored under ambient conditions.

E2-3. The resulting Strata variety hop material after treatment of either E2-1 or E2-2 were mechanically ground and added to a 20 mL scintillation vial followed by addition of a powdered Centennial flavor additive (Abstrax Tech brand) in the amounts shown in Table 1 (P-1-1, P-1-2, P-1-3, P-1-4). The resulting solid mixture was agitated for 10 min to homogenize the sample, and was then pelletized.

E2-4. The resulting Strata variety hop material after treatment of either E2-1 or E2-2 were mechanically ground and added to a 20 mL scintillation vial followed by addition of a liquid Centennial flavor additive (Abstrax Tech brand) in the amounts shown in Table 1 (P-2-1, P-2-2, P-2-3). The resulting solid mixture was agitated for 10 min to homogenize the sample and was then pelletized.

Example 3: Sample Preparation and Testing

2-Dimensional gas chromatography coupled with mass spectrometry was used to validate increases in flavor components in the samples P-3-1, P-3-2, P-3-3, and P-3-4. The sample preparation was done using a Centri autosampler platform (Markes International). The resulting 20 mL aliquots of the prepared samples were capped using an electric crimper in a 30 mL HiSorb vial. The sample was then agitated for 30 min and heated at 45° C. with a HiSorb solid-phase microextraction probe (PDMS solid phase) inserted into the aqueous phase to capture the organic flavor component from the liquid. The hisorb was desorbed onto a cryogen-free cold trap held at 25° C. the cold trap was rapidly heated to 300° C. to desorb the sample in a narrow band onto the analytical columns. The GC×GC column configuration was an apolar to polar setup. The GC oven ramp rates used were as follows:

The oven was initially set to 40° C. and held for 3 min. The oven was then ramped at a rate of 3.4° C. per minute to 92° C., followed by a 3.7° C. ramp rate to 125° C., followed by a 3.9° C. ramp rate to 170° C., followed by a 4° C. ramp rate to 215° C., followed by a 4.1° C. ramp rate to 235° C., followed lastly by a 15° C. ramp rate to 270° C. with a 5 min hold time. The modulation period set for the flow modulator was 5.5 s.

2-Dimensional gas chromatography coupled with mass spectrometry was used to analyze the flavor and aroma compounds present in the aqueous phase of the P-3 set of experiments. This analysis was performed using the INSIGHT reverse fill flush flow modulator (SepSolve Analytical). This was coupled for data generation to an Agilent 7890B GC equipped with a BPX5 (20 m×0.18 mm ID×0.18 μm film thickness) 1st dimension column and Mega Wax (4.8 m×0.32 mm ID×0.15 μm film thickness) 2nd dimension column and BenchTOF-Select time-of-flight mass spectrometer (Markes International). Time-of-flight mass spectrometry (TOF-MS) was used to identify compounds.

Example 4: Identification and Analysis of Aroma Compounds

E4-1. 4 g of Hop pellets of the centennial variety were ground into a fine powder and mixed with 0.1 g of butane extracted hop oil (Abstrax Tech brand). 1 g of the resulting hop biomass was then infused into 20 mL of water, agitated, and soaked for 10 min and analyzed using 2-Dimensional gas chromatography coupled with mass spectrometry.

E4-2. 4 g of Hop pellets of the centennial variety were ground into a fine powder and mixed with 0.1 g of butane extracted hop oil (Abstrax Tech brand). 200 mg of an emulsion (2% flavor loading) of Skyfarm Pineapple Water Soluble blend (Abstrax Tech brand) was then added to the hop pellets and homogenized. The water was reduced by gentle heat over the course of a few hours. 1 g of the resulting dried hop biomass was then infused into 20 mL of water, agitated, and soaked for 10 min and analyzed using 2-Dimensional gas chromatography coupled with mass spectrometry.

E4-3. 4 g of Hop pellets of the centennial variety were ground into a fine powder. 200 mg of an emulsion (2% flavor loading) of Skyfarm Pineapple Water Soluble blend (Abstrax Tech brand) was then added to the hop pellets and homogenized. The water was reduced down by gentle heat over the course of a few hours. 1 g of the resulting dried hop biomass was then infused into 20 mL of water, agitated, and soaked for 10 min and analyzed using 2-Dimensional gas chromatography coupled with mass spectrometry.

E4-4. 4 g of Hop pellets of the centennial variety were ground into a fine powder. 800 mg of an emulsion (2% flavor loading) of Skyfarm Pineapple Water Soluble blend (Abstrax Tech brand) was then added to the hop pellets and homogenized. The water was reduced down by gentle heat over the course of a few hours. 1 g of the resulting dried hop biomass was then infused into 20 mL of water, agitated, and soaked for 10 min and analyzed using 2-Dimensional gas chromatography coupled with mass spectrometry.

Results

The experiments exemplify how hops can be used as a convenient carrier for flavoring additives in food applications such as the brewing process. It is shown that both liquid phase (e.g., neat, un-emulsified or carrier-containing flavor compositions) and solid phase (e.g., flavor compositions integrated into a dried emulsion system or other carrier system) can be effectively infused into hop vegetal material to substantially increase the loading of available flavor compounds. Importantly, it was observed that the samples that contained a powdered form of the flavor additive provides a unique vehicle to increase solubility of the flavor compounds present. The water-soluble nature of these additives enhances the amount and types of compounds that can transfer into the aqueous phase at much higher amounts than available using just traditional hop pellets. The data show that addition of a powder additive (E1-1 and E2-3) at different concentrations (e.g., dosed in concentrations shown in Table 1 (P-1-1, P-1-2, P-1-3, P-1-4)) can significantly increase the amount of desired aroma compounds in the hop pellet, while concomitantly decreasing the amount of vegetal matter. For example, FIG. 1 shows 2-Dimensional gas chromatograms of P-0, P-1-1, and P-1-2 that illustrates enhanced analyte concentrations for many volatile compounds as a function of flavor dosage. The increased amount of aroma compounds that are desirable results in a decreased amount of vegetative matter needed to reach the flavor desired during brewing. These results confirm the effectiveness of a new method provided by the present technology, for introducing a larger fraction of aroma profiles into the aqueous phase, that was until now not possible, while concomitantly reducing the amount of vegetal material needed.

Figure 2:
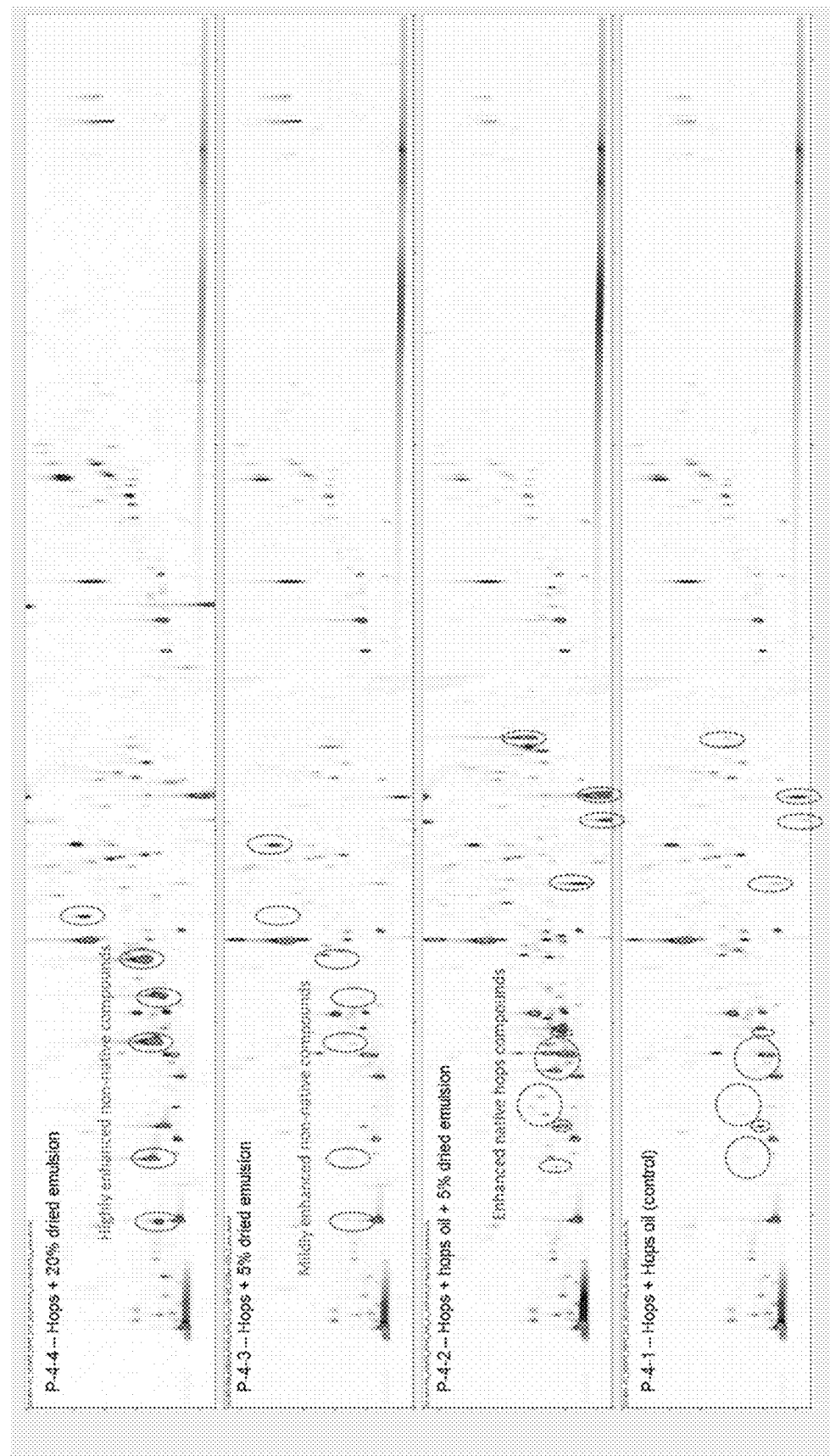
FIG. 2 represents 2-Dimensional chromatograms of the GC×GC-TOF-MS highlighting the enhancement of compounds in hops material dosed with flavor emulsions and/or exogenous hop oils.

The enhancement of flavor compounds was verified for both compounds that are endogenous to hops and exogenous, using 2-Dimensional gas chromatography coupled with mass spectrometry. FIG. 2 shows the 2-dimensional chromatograms for the GC×GC-TOF-MS data for experiments P-3-1 through P-3-4. As can be seen, P-3-2, wherein the hops material is dosed with both an exogenous hops oil (~10% addition by mass) and the emulsion was found to surprisingly exhibit an unexpected enhancement of hop-specific flavor compounds that are not present in the emulsified flavor blend (relative to the control P-3-1). This data shows that the pellets infused with both exogenous hop oil and emulsified flavor blends can also enhance the native aroma and flavor compounds in hops without imparting strong exogenous flavors by using a small amount of the emulsifier (e.g., 5% by mass). Without wishing to be bound to a theory, it is hypothesized that the emulsion can interact with the exogenous hop oil to further liberate flavor compounds into the water phase.

In comparison, when the hop oil is not included in the pellet, the emulsion instead enhances the flavor blend specific compounds systematically, depending on the dosage. For example, P-3-3 shows a 5% dosing which provides increased levels of compounds found in the flavor blend that are not found in hops. Likewise, P-3-4, which had a dosage of 20%, exhibited significantly enhanced flavor load compared to the other samples. This data further validates that this method of infusion can also increase the concentrations of exogenous compounds that maybe beneficial for enhancing the flavor of the hops.

It is of note that the reduction of the aroma compounds or essential oil endogenous to hops provides even greater versatility for flavor optimization. Methods E2-1 and E2-2 showed that butane can act as an excellent solvent to reduce the oil content of kilned or un-kilned hop cones or pellets, leaving behind vegetal matter with minimal flavor impact. Likewise, freeze drying reduced the amount of oil significantly to the point where no aromatic scents were detected on the resulting vegetal material. These methods produce ideal products when minimal existing aromas are desired when infusing the hop materials with a flavor additive system.

A useful alternative to integration of a powdered flavor device with hop vegetal matter is to completely eliminate the vegetal hop material, as shown in P-1-5. In this example, the powdered flavor material with no vegetal material was pelletized. While the vegetal material may provide certain flavor elements, P-1-5 ensures that only the flavor of choice can be infused without the use of hop vegetal material, if desired. This ensures the same form factor that the raw powder does not adhere to, as well as ensures that flavors or alpha acids present in the hop vegetal matter will not be present.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

All disclosed ranges are to be understood to encompass and provide support for claims that recite any and all subranges or any and all individual values subsumed by each range. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth). Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like, include the number recited and refer to ranges which may be subsequently broken down into subranges as discussed above. Finally, as will be understood by one skilled in the art, a range includes each individual member. Thus, for example, a group having 1-3 layers refers to groups having 1, 2, or 3 layers. Similarly, a group having 1-5 layers refers to groups having 1, 2, 3, 4, or 5 layers, and so forth.

The drawings shall be interpreted as illustrating one or more embodiments that are drawn to scale and/or one or more embodiments that are not drawn to scale. This means the drawings may be interpreted, for example, as showing: (a) everything drawn to scale, (b) nothing drawn to scale, or (c) one or more features drawn to scale and one or more features not drawn to scale. Accordingly, the drawings can serve to provide support to recite the sizes, proportions, and/or other dimensions of any of the illustrated features either alone or relative to each other. Furthermore, all such sizes, proportions, and/or other dimensions are to be understood as being variable from 0-100% in either direction and thus provide support for claims that recite such values or any and all ranges or subranges that may be formed by such values.

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used in this document shall mean" or similar language (e.g., "this term means," "this term is defined as," "for the purposes of this disclosure this term shall mean," etc.). References to specific examples, use of "i.e.," use of the word "technology," etc., are not meant to invoke exception (b) or otherwise restrict the scope of the recited claim terms. Other than situations where exception (b) applies, nothing contained in this document should be considered a disclaimer or disavowal of claim scope.

Unless otherwise defined, all terms (including technical and scientific terms) used herein have the same meaning as commonly understood by one of ordinary skill in the art to which this technology belongs. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein. While not explicitly defined below, such terms should be interpreted according to their common meaning.

In addition, where features or aspects of the disclosure are described in terms of Markush groups, those skilled in the art will recognize that the disclosure is also thereby described in terms of any individual member or subgroup of members of the Markush group.

Unless the context indicates otherwise, it is specifically intended that the various features of the technology described herein may be used in any combination. Moreover, the disclosure also contemplates that in certain embodiments, any feature or combination of features set forth herein may be excluded or omitted. To illustrate, if the specification states that a complex comprises components A, B and C, it is specifically intended that any of A, B or C, or a combination of any two or more thereof, may be omitted and disclaimed singularly or in any combination.

Unless explicitly indicated otherwise, all specified embodiments, features, and terms intend to include both the recited embodiment, feature, or term and biological equivalents thereof.

All patents, patent applications, provisional applications, and publications referred to or cited herein are incorporated by reference in their entirety, including all figures and tables, to the extent they are not inconsistent with the explicit teachings of this specification.

Other embodiments are set forth in the following claims.

What is claimed is:

1. A method for infusing a hop material with a flavorant matrix, the method comprising:
providing an emulsified flavorant matrix comprising a flavorant additive emulsified in a carrier system; and
infusing the hop material with the emulsified flavorant matrix to form an infused hop material;
wherein the hop material comprises raw beer, hops, hop pellets, raw vegetal material derived from hops, or a cryogenically prepared hop lupulin.

2. The method of claim 1, wherein the flavorant additive comprises hop oil, hop extract, flavor blends or non-hop derived flavorant compound.

3. The method of claim 1, wherein the emulsified flavorant matrix comprises water-soluble liquid or water-soluble powder.

4. The method of claim 1, wherein the flavorant additive is emulsified into a water-soluble liquid or water-soluble powder matrix to form the emulsified flavorant matrix.

5. The method of claim 1, wherein the hop material comprises raw hops, pellets, or a raw vegetal material derived from hops.

6. The method of claim 1, wherein the carrier system comprises oils, emulsifiers or terpenes.

7. The method of claim 1, wherein infusing the hop material with the emulsified flavorant matrix comprises electrospray application, submersion, passive diffusion, aerosolizing, mixing, or cold-pressing.

8. The method of claim 2, wherein the flavorant additive comprises hop oil, and the hop oil is prepared by butane extraction of a hops source material.

9. The method of claim 8, wherein the hop oil is substantially free of one or more of bittering acids, waxes, and lipids.

10. The method of claim 1, wherein the flavorant additive comprises bittering acids.

11. The method of claim 10, wherein the bittering acids comprise an isomerized bittering acid or an un-isomerized bittering acid.

12. The method of claim 10, wherein the flavorant additive comprises one or more un-isomerized bittering acids.

13. The method of claim 1, wherein the flavorant additive comprises alpha acids or beta acids.

14. The method of claim 1 further comprising infusing a beer with the infused hop material.

15. The method of claim 14, wherein the carrier system comprises lecithin.

\* \* \* \* \*